(12) United States Patent
Ziegler

(10) Patent No.: US 6,480,099 B1
(45) Date of Patent: Nov. 12, 2002

(54) MODULATION METHOD FOR DATA TRANSMISSION FROM A TRANSPONDER TO A READ-WRITE DEVICE

(75) Inventor: Werner Ziegler, Heilbronn (DE)

(73) Assignee: TEMIC Semiconductor GmbH, Heilbronn (DE)

( * ) Notice: Subject to any disclaimer, the term of this patent is extended or adjusted under 35 U.S.C. 154(b) by 0 days.

(21) Appl. No.: 09/172,080

(22) Filed: Oct. 14, 1998

(30) Foreign Application Priority Data

Oct. 14, 1997 (DE) .......................................... 197 45 310

(51) Int. Cl.⁷ ................................................. H04Q 1/00
(52) U.S. Cl. ................. 340/10.1; 340/10.34; 340/572.5
(58) Field of Search ............................ 340/572.5, 10.1, 340/10.4, 10.34

(56) References Cited

U.S. PATENT DOCUMENTS

| | | | | | |
|---|---|---|---|---|---|
| 4,333,072 A | * | 6/1982 | Biegel | ...................... | 340/10.34 |
| 4,654,658 A | * | 3/1987 | Walton | ...................... | 340/10.1 |
| 5,266,926 A | * | 11/1993 | Biegel | ...................... | 340/10.34 |
| 6,079,622 A | * | 6/2000 | Goto | ...................... | 340/10.1 |

FOREIGN PATENT DOCUMENTS

| | | |
|---|---|---|
| DE | 4242112 A1 | 6/1994 |
| DE | 4434240 C1 | 11/1995 |

* cited by examiner

*Primary Examiner*—Brian Zimmerman
(74) *Attorney, Agent, or Firm*—Venable; Norman N. Kunitz

(57) ABSTRACT

A modulation method for transponders where data transmission from the transponder to the read-write device is ensured even if the transponder circuits are supplied only with the minimum requisite operating voltage in that the amplitude of modulation voltage provided by a modulator is caused by reducing the supply current flowing in the transponder.

7 Claims, 1 Drawing Sheet

MODULATION METHOD FOR DATA TRANSMISSION FROM A TRANSPONDER TO A READ-WRITE DEVICE

BACKGROUND OF THE INVENTION

This invention concerns a modulation method and a configuration for data transmission from a transponder to a read-write device, where the transponder is supplied with energy from the read-write device via an alternating field and where data transmission is effected in bidirectional mode by modulation of the energy transferring alternating field. A transponder system comprising a read-write device and at least one transponder is described in printed publication DE 42 42 112 A1, for example.

For the transfer of energy from the read-write device to a transponder, an antenna oscillation circuit in the read-write device is supplied with a highfrequency alternating voltage. This produces an electromagnetic alternating field in the coil of the antenna oscillation circuit, which propagates into the space around the read-write device.

This energy transferring, electromagnetic alternating field induces an alternating voltage in one of the transponder antenna circuits, which is described in the following as antenna voltage. The layout of the transponder antenna circuit, comprising primarily a transponder coil and a capacitor connected in parallel, is such that it operates in resonance with the frequency of the antenna oscillating circuit.

The antenna voltage is rectified by a rectifier stage and is available to the transponder circuits, usually a data storage device and a control unit, as a supply voltage. A transponder system represents a loosely coupled transformer, which, because of the low coupling factor, can only transfer very little energy. The coupling factor, and thus the supply voltage available in the transponder, is dependent on the distance from the coil of the antenna oscillating circuit in the read-write device to the coil of the transponder's antenna circuit.

In the case of short distances relative to the read-write device, a transponder can receive so much energy that there has to be a protective circuit to protect the transponder circuits from excessively high supply voltages. A protective circuit of this type—for example—can be implemented by a Zener diode connected against the reference potential.

Data transmission from the read-write device to the transponder is effected by means of a momentary data-sensitive shutdown of the energy transferring alternating field, resulting in data-sensitive field gaps within the energy transferring alternating field; these cause data-sensitive fluctuations of the antenna voltage and of the supply voltage in the transponder. An additional capacitor, arranged in parallel to the transponder circuits, ensures that, during the field gaps in the energy transferring alternating field, the supply voltage does not fall below the minimum operating voltage required by the transponder circuits. The additional capacitor also smoothes the supply voltage for the transponder circuits.

Data transmission from the transponder to the read-write device is effected by data-sensitive modulation of the energy transferring alternating field. To this end, the antenna voltage or the supply voltage of the transponder is attenuated by a modulator, which increases the current flowing in the transponder by the additional connection of a load. The modulator comprises a connected load, arranged in parallel to the transponder antenna circuit. For example, the load may be implemented as a controllable switch, connected against the reference potential.

When the modulator switch is open, i.e. in its unattenuated state, the antenna voltage will only be loaded by the currents of the transponder circuits, the protective circuit and the additional capacitor.

When the switch is closed, i.e. in its attenuated state, an additional current flows through the modulator, which puts a heavy load on the antenna circuit and causes a clear drop in antenna voltage. The difference between the antenna voltage in its attenuated and unattenuated state is designated as an amplitude of modulation voltage. As long as a transponder achieves its typical value for the amplitude of modulation voltage, data transmission is possible from the transponder to the read-write device.

However, the modulator may load the antenna circuit only to the extent that the supply voltage does not fall below the minimum operating voltage value required for the transponder circuits. The drop in antenna voltage is therefore limited to a minimum value. This means that the amplitude of modulation voltage which the modulator produces is dependent on the difference between the antenna voltage and the minimum operating voltage required for the transponder circuits.

The main disadvantage of a transponder set up in this way is that, if the distances from the transponder to the read-write device are such that the supply voltage is only just sufficient to operate the transponder circuits, the amplitude of modulation voltage which can be achieved by the modulator will no longer be sufficient for data transmission from the transponder to the read-write device.

SUMMARY OF THE INVENTION

The invention is based on the task to specify a modulation method for data transmission from a transponder to a read-write device which avoids this disadvantage.

According to the invention, this task is solved by a modulation method for transmitting data from a transponder to a read-write device, wherein the transponder is provided with a modulator for generating a modulation voltage amplitude, and wherein the modulation voltage amplitude is caused by a reduction in the transponder supply current flowing in the transponder. With the modulation method for data transmission from a transponder to a read-write device in accordance with this invention, the amplitude of modulation voltage produced by a modulator will be effected by a reduction in the supply current flowing within the transponder.

The modulator will be formed by a circuit to produce a voltage drop and to reduce the supply current flowing in the transponder. For example, this circuit can be formed by a modulator resistor, which can be bridged by a controllable switch connected in parallel.

The amplitude of modulation voltage in the transponder is effected by bridging the modulator resistor. No additional load is connected in the transponder, instead the load for the antenna circuit is reduced. This reduces the supply current flowing in the transponder, and consequently the load in the antenna circuit is reduced, and the antenna voltage increases.

In this way the energy which, during data transmission from the transponder to the read-write device, must be withdrawn from the antenna circuit in order to attenuate the energy transferring alternating field is not consumed in the additional load; instead the energy is stored in an additional capacitor and can be made available to the transponder circuits as and when required.

The transponder comprises an antenna circuit containing a transponder coil with a capacitor connected in parallel, a rectifier, a modulator, a clamping and protective circuit, an additional capacitor and the transponder circuits. Here, the modulator is arranged in series between the antenna circuit and the transponder circuits. The rectifier is arranged in series before or after the modulator. The clamping and protective circuit and the additional capacitor are arranged in parallel to one another between the modulator and the transponder circuits.

The transponder circuits comprise a demodulator, a data storage device and a control unit, arranged in parallel to one another.

With distances between the transponder and the read-write device where the transponder circuits are only just supplied with sufficient energy, this has the effect of ensuring data transmission from the transponder to the read-write device. There is an increase in the distance at which data transmission can still occur.

The modulation method according to the invention is particularly suitable for transponders with transponder circuits where the power consumption is not negligible and cannot be disregarded.

The minimum setup for transponder circuits is a demodulator, a data storage device, and a control unit, arranged in parallel to one another and in parallel to the antenna circuit.

According to the invention, this modulation method for data transmission from a transponder to a read-write device will ensure functional reliability of the transponder system.

BRIEF DESCRIPTION OF THE DRAWINGS

Below, the modulation method for data transmission from a transponder to a read-write device is described in more detail with reference to two figures.

The figures illustrate the following.

DETAILED OF A PREFERRED EMBODIMENT

Figure 1:
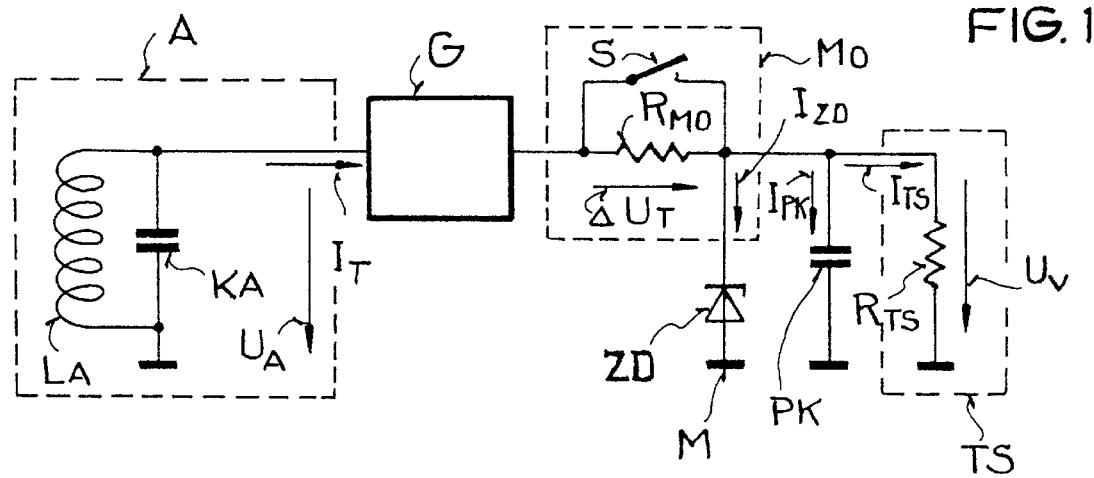
FIG. 1 a basic circuit diagram of a transponder complete with all assemblies required for the modulation method according to the invention, FIG. 2 a diagrammatic view of the voltages flowing in the transponder at the minimum and maximum possible distances between the transponder and a read-write device.

FIG. 1 shows the basic circuit diagram of a transponder. Antenna circuit A of the transponder is formed by a transponder coil $L_A$ and a capacitor $K_A$, connected in parallel. A clamping and protective circuit, an additional capacitor and transponder circuits TS are arranged in parallel to antenna circuit A. The clamping and protective circuit is formed by a Zener diode ZD with a breakdown voltage of 3 volts. The additional capacitor is described below as buffer capacitor PK. A rectifier G and a modulator MO are arranged in series between antenna circuit A and Zener diode ZD.

The energy supply of the transponder is effected by means of an energy transferring alternating field of a read-write device. Transponder coil $L_A$ of antenna circuit A is arranged in such a way that it operates in resonance to the frequency of the energy transferring alternating field of the read-write device. Antenna circuit A of the transponder can here be regarded as a source of alternating voltage with an internal resistance. Rectifier G rectifies antenna voltage $U_A$ of antenna circuit A and, after modulator MO, is available to transponder circuits TS as supply voltage $U_V$. Transponder circuits TS, comprising a demodulator, a control unit and a storage unit are shown in diagrammatic form in the Figure by their circuit resistor $R_{TS}$.

Modulator MO is connected in series to rectifier G. Modulator MO is formed by a circuit which creates a voltage drop and reduces the supply current $I_T$ flowing in the transponder. In the present example, the circuit is formed by a modulator resistor RM with a controllable switch S, connected in parallel.

As the read-write device and the transponder represent a loosely coupled transformer, with a coupling factor dependent on the distance of the read-write device and of the transponder, antenna voltage $U_A$ of the transponder is also dependent on this distance. The minimum operating voltage $U_{Bmin}$ required to operate transponder circuits TS is 1.8 volts. The maximum permissible operating voltage $U_{Bmax}$ required to operate transponder circuits TS is 6.5 volts.

With shorter distances between the read-write device and the transponder, antenna voltage $U_A$ can climb to over 100 volts. This type of overvoltage, which is harmful to transponder circuits TS, is carried away to reference voltage M by a Zener diode ZD. The maximum permissible operating voltage $U_{Bmax}$ for the transponder circuits is 6.5 volts. To guarantee that modulator MO can actually create the amplitude of modulation voltage $\Delta U_T$, a Zener diode ZD with a breakdown voltage of 3 volts is selected. At supply voltage $U_V$ above 3 volts, the Zener diode ZD breaks down and protection current $I_{ZD}$ flows through the Zener diode ZD to reference potential M. In addition to protection current $I_{ZD}$ of the Zener diode ZD, a storage current $I_{PK}$ can flow into the buffer capacitor PK arranged in parallel to the Zener diode ZD.

Data transmission from the read-write device to the transponder is effected by means of the data-sensitive interruptions of the energy transferring alternating field of the read-write device. During these interruptions, buffer capacitor PK provides for the voltage supply of transponder circuits TS, such that the distance, at which secure data transmission from the transponder to the read-write device is ensured, can be increased. In addition to this, fluctuations in the supply voltage $U_V$, which may cause interference in the transponder circuits TS, are smoothed by the buffer capacitor PK. For example, the buffer capacitor PK also makes possible the use of transponder circuits TS which have a current requirement which is not negligible and cannot be disregarded.

For data transmission from the transponder to the read-write device, switch S of modulator MO is driven data-sensitively by a control element of the transponder circuits TS.

When the switch S is closed, the antenna circuit A is loaded by the useful current $I_{TS}$ of the transponder circuits TS, by the protection current $I_{ZD}$ of the Zener diode ZD, and, if applicable, by the storage current $I_{PK}$ of the buffer capacitor PK. The level of the supply voltage $U_V$ is determined by the Zener diode ZD.

When the switch S is open, the modulator resistor RM reduces the load of antenna circuit A by the modulator current $I_{MO}$, causing the antenna voltage $U_A$ to climb. This rise in the antenna voltage $U_A$ represents the amplitude of modulation voltage $\Delta U_T$ of the transponder, which results in differences in the loading of the energy transferring alternating field of the read-write device. In the antenna oscillation circuit of the read-write device, these differences in the loading result in slight changes in the voltage, which are evaluated in a reception circuit in the read-write device.

Figure 2:
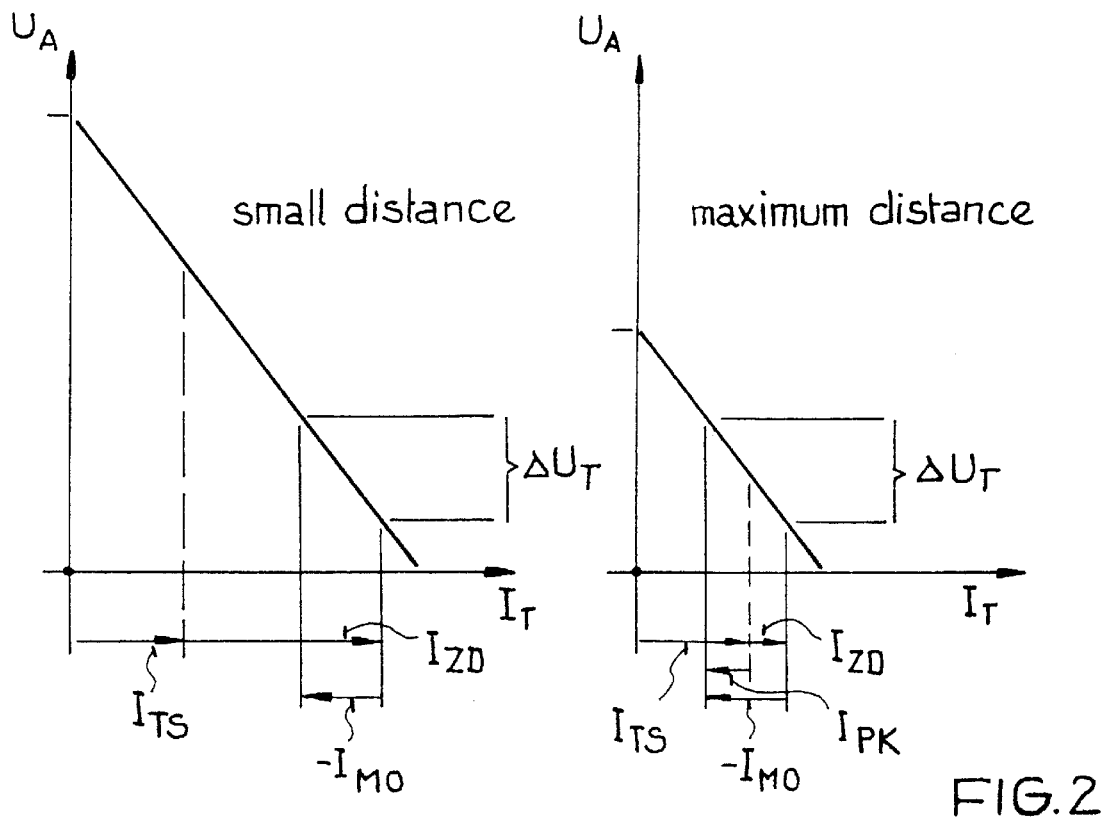

In FIG. 2, the voltage ratios caused by this modulation method are shown both for a short distance and for the maximum distance of the transponder to the read-write device. With the maximum distance of the transponder to the read-write device, the antenna voltage $U_A$ is only just sufficient for the secure operation of the transponder circuits TS. The antenna voltage $U_A$ is always plotted above the supply current $I_T$ flowing in the transponder.

With short distances between the transponder and the read-write device, to create amplitude of modulation voltage $\Delta U_T$, the switch S is opened to reduce the supply current $I_T$ by the modulator current $I_{MO}$ from the modulator MO, which increases the antenna voltage $U_A$ by the amplitude of modulation voltage $\Delta U_T$. This only reduces the protection current $I_{ZD}$ through the Zener diode ZD. As long as the antenna circuit A is delivering such a high supply current $I_T$, that a protection current $I_{ZD}$ is flowing through Zener diode ZD, the useful current $I_{TS}$ required by the transponder circuits TS is available.

With the maximum distance between the transponder and the read-write device to create the amplitude of modulation voltage $\Delta U_T$, the switch S is again opened to reduce the supply current $I_T$ also by the modulator current $I_{MO}$ from the modulator MO, which again increases the antenna voltage $U_A$ by the amplitude of modulation voltage $\Delta U_T$. If required, a storage current $I_{PK}$ flows from the buffer capacitor PK and contributes to the supply of transponder circuits TS, with useful current $I_{TS}$ for the transponder circuits TS being composed of the modulator current $I_{MO}$ and the storage current $I_{PK}$ from the buffer capacitor PK.

If closing the switch S of the modulator MO causes the antenna voltage $U_A$ to drop, then a higher supply current $I_T$ is available and the capacitor PK is again charged.

With this modulation method therefore, there is a higher amplitude of modulation voltage $\Delta U_T$, even if the antenna voltage $U_A$ is only just over the minimum 1.8 volts operating voltage $U_{Bmin}$ of the transponder circuits TS.

As long as the antenna circuit A is capable, on average, to withdraw sufficient energy from the energy transferring alternating field to supply the transponder circuits TS with the minimum requisite operating voltage $U_{Bmin}$, a transponder working in accordance with the modulation method according to this invention, can achieve the typical amplitude of modulation voltage $\Delta U_T$ by reducing the load of the antenna circuit A.

What is claimed is:

1. Modulation method for data transmission from a transponder to a read-write device, including creating an amplitude of modulation voltage with a modulator contained in the transponder, causing the amplitude of modulation voltage by a reduction of the supply current flowing in the transponder, and wherein an additional capacitor stores surplus energy during data transmission from the transponder to the read-write device, which energy can then be supplied to the transponder circuits as required.

2. Modulation method according to claim 1, wherein the modulator is formed by a circuit which creates a voltage drop, thus reducing the supply current flowing in the transponder.

3. Configuration for implementing a modulation, comprising a transponder that contains a modulator, an antenna circuit, a rectifier, a clamping and protective circuit, an additional capacitor, and transponder circuits, where the antenna circuit, the clamping and protective circuit, the additional capacitor, and the transponder circuits are connected in parallel and where the modulator is arranged in series between the antenna circuit and the clamping and protective circuit and where the rectifier is arranged in series before or after the modulator.

4. Configuration according to claim 3, wherein the antenna circuit is formed by a transponder coil and a capacitor connected in parallel.

5. Configuration according to claim 3, wherein the modulator is formed by a modulator resistor with a controllable switch connected in parallel.

6. Configuration according to claim 3, wherein the clamping and protective circuit is formed by a Zener diode.

7. Configuration according to claim 3, wherein the transponder circuits comprise a demodulator, a data storage device and a control unit, and are connected in parallel to one another and in parallel to the antenna circuit.

* * * * *